United States Patent [19]

Hardesty

[11] Patent Number: 4,776,142

[45] Date of Patent: Oct. 11, 1988

[54] METHOD OF INSTALLING A RADIANT BARRIER

[76] Inventor: George R. Hardesty, 10859 Roxann La., Jacksonville, Fla. 32218

[21] Appl. No.: 820,857

[22] Filed: Jan. 21, 1986

[51] Int. Cl.⁴ .................. B32B 15/02; B32B 5/16; E04B 1/74; E04G 21/00

[52] U.S. Cl. .................. 52/407; 52/309.4; 52/309.8; 52/404; 52/743; 428/328

[58] Field of Search .......... 52/743, 309.4, 309.6, 52/407, 406, 404, 309.8; 428/317.9, 328

[56] References Cited

U.S. PATENT DOCUMENTS

| Re. 19,929 | 4/1936 | Slayter | 52/743 |
|---|---|---|---|
| 1,920,931 | 8/1933 | Finley | 428/328 |
| 2,029,679 | 2/1936 | Seving et al. | 428/328 |
| 2,235,542 | 3/1941 | Wenzel | 52/743 |
| 3,022,187 | 2/1962 | Eyraud et al. | 428/317.9 |
| 3,459,628 | 8/1969 | Dixon et al. | 428/317.9 |
| 3,470,059 | 9/1969 | Jonnes | 428/317.9 |
| 3,591,400 | 7/1971 | Palmquist et al. | 428/328 |
| 3,802,944 | 4/1974 | Tung | 428/317.9 |
| 4,310,587 | 1/1982 | Beaupre | 428/328 |
| 4,346,133 | 8/1982 | Hipchen et al. | 428/317.9 |
| 4,406,095 | 9/1983 | Slavik | 52/407 |

FOREIGN PATENT DOCUMENTS

| 2649339 | 11/1978 | Fed. Rep. of Germany | 52/743 |
|---|---|---|---|
| 2842213 | 4/1980 | Fed. Rep. of Germany | 52/309.4 |
| 613371 | 9/1979 | Switzerland | 52/309.4 |
| 1002620 | 8/1965 | United Kingdom | 52/309.4 |

Primary Examiner—Carl D. Friedman
Assistant Examiner—Michael Safavi
Attorney, Agent, or Firm—Foley & Lardner

[57] ABSTRACT

A method for installing a radiant barrier in a building, particularly on an attic floor, is carried out by randomly distributing shreds of a thin, reflective foil in an attic space to form a bed of foil shreds on the attic floor. The foil shreds reflect longwave radiation and thereby provide a radiant barrier which reduces radiant heat transfer in the attic space. An insulating material useful in such a method includes a bat of insulation disposed, for example, on an attic floor, and a bed of reflective foil shreds covering the layer of insulation.

14 Claims, 1 Drawing Sheet

METHOD OF INSTALLING A RADIANT BARRIER

FIELD OF THE INVENTION

This invention relates to an easy, economical method of installing a radiant barrier layer in structures such as attics. The present invention further provides a novel apparatus for installing a radiant barrier layer, and an insulating material which can be assembled by practicinq the method of the present invention.

BACKGROUND OF THE INVENTION

It is well known that insulated home attics tend to become very hot during the summer. Attic fans which draw hot air out of the attic cool the attic by causing cooler air from below to flow upwardly into the attic space. Such increased air circulation, while helpful, is only partially effective in keeping attics cool during the summer (cooling) season.

It has recently been discovered that, during the cooling season, long-wave solar radiation passes through the roof and attic air space and directly heats insulation typically disposed in a layer on the floor of the attic. This heat flux causes the attic insulation to heat the air in the attic space above by convection. These findings contradict the traditional belief that the insulation is heated by the attic air.

Tests by the Florida Solar Energy Center (FSEC) have confirmed that attic overheating occurs largely because of absorption of long-wave radiation by attic insulation. The following publications discss this concept and propose installing a reflective barrier to prevent heating of attic insulation: Fairey, *Designing and Installing Radiant Barrier Systems*, Florida Solar Energy Center publication FSEC-DN-7-84 and Fairey, *Radiant Energy Transfer and Radiant Barrier Systems in Buildings*, Florida Solar Energy Center publication FSEC-DN-6-84 the contents of both of which are hereby incorporated by reference herein. The foregoing publications describe the theory of radiant barriers and recommend locations for the radiant heat barrier in the roof system. In new construction, such a radiant barrier can be constructed by applying foil sheets in a variety of positions to the roof structure above the insulation layer so as to prevent long-wave radiation from reaching the thermal insulation layer. Foil sheets are typically used, and the foil sheets must be perforated in order to prevent them from forming a vapor barrier. Such foil sheetng is effective to eliminate 95% of the radiant heat transfer which would ordinarily occur across the attic.

Energy savings resulting from the installation of a radiant barrier layer will vary from structure to structure depending on the type and quantity of insulation. However, even as to new construction, placement of foil sheets as proposed by the FSEC is highly labor-intensive. In particular, in existinq buildings, it may be in some cases extremely difficult or impossible to retrofit such foil sheets.

Metallic foil has been used as thermal insulation. Thermal insulating structures using metallic foil insulation have been constructed in a variety of forms. For example, panels comprising a pair of thin metal walls having insulating filler therebetween are known, as illustrated by Woodson U.S. Pat. No. 1,626,655, issued May 3, 1927, and Finck U.S. Pat. No. 1,967,611, issued July 24, 1934. Additionally, metallic materials have been used as insulating fillers, such as ribbons of aluminum foil as described in Kiesel U.S. Pat. No. 2,175,630, issued Oct. 10, 1939, and particles coated with metallic paint, as described in Wasserback U.S. Pat. No. 2,896,278, issued July 28, 1959. More recently, however, metallic insulation has fallen into disuse, mainly because materials such as aluminum foil lose their reflective properties when they become wet or damp. Additionally, fibrous insulating materials such as fiberglass have higher R-values per unit cost, and have thus generally replaced metalic materials as thermal insulating materials.

SUMMARY OF THE INVENTION

The present invention provides a method for installing a radiant barrier which is much less labor-intensive than installing foil sheeting, and can be practiced even in confined spaces of existing structures. More particularly, the present invention provides a method for installing a radiant barrier layer in a building having an attic or other confined space by distributing a multitude of shreds of thin reflective material on the floor of the attic space with sufficient overlap between shreds so as to form an effective radiant barrier layer. The radiant barrier layer can conveniently be formed directly on an existing thermal insulation layer.

According to a second aspect of the invention, an insulating material includes a layer of non-metallic thermal insulation and a layer of tangled shreds of thin, reflective material such as foil superposed on the thermal insulation layer. Such an insulating material can conveniently be formed by practicing the method of the invention in an attic already containinq a layer of thermal insulation.

According to a further aspect of the present invention, an apparatus is provided for carrying out one embodiment of the insulating method of the present invention. This apparatus includes a shredder for shredding a sheet of thin, reflective foil and a blower unit which receives the foil shreds and is effective to eject them into the attic space.

BRIEF DESCRIPTION OF THE DRAWING

Preferred exemplary embodiments of the invention will hereinafter be described in conjunction with the appended drawing, wherein like designations denote like elements, and.

DETAILED DESCRIPTION OF PREFERRED EXEMPLARY EMBODIMENTS

Figure 1:
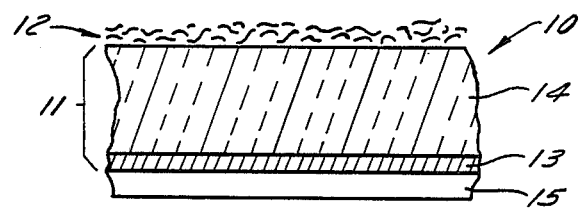
FIG. 1 is a cross-sectional view of a first embodiment of the insulating material according to the invention.

FIG. 1 illustrates a typical insulating material according to the present invention. Insulating material 10 includes a thermal insulating layer 11 and a radiant barrier layer 12. Insulation layer 11 comprises a substantially non-reflective, preferably non-metallic, insulation. In this context, "non-reflective" refers to reflection of long-wave solar radiation (infrared radiation) and generally includes any material which does not have a shiny, lustrous, or mirror-like surface. Such non-reflective insulation includes fiberglass, mineral fibers such as rock wool, natural fibers such as cellulose, polymeric foams such as polystyrene and polyurethane, and particulate rocks and minerals such as vermiculite and perlite. Insulation layer 11 is generally at least 1 inch thick, preferably at least 2 inches thick, most preferably at least 4 inches thick, especially 4 to 6 inches thick. Such thickness is determined in accordance with the properties of the insulation and the desired R-value.

In the embodiment of FIG. 1, thermal insulating layer 11 comprises a conventional fiberglass insulation batt including a vapor barrier layer 13 and a fiberglass fiber layer 14. Vapor barrier layer 13 typically comprises a thin sheet of metallic foil, plastic or tar paper adhered to one face of fiberglass layer 14.

Radiant barrier layer 12 comprises a multiplicity of small shreds of a thin material effective to reflect long-wave solar radiation. Foil shreds, when distributed randomly on a surface, will form a loose layer on the surface which, even though of measurable thickness, may not completely cover the surface. At a certain thickness, however, coverage will approach 100% as small holes extending through the shred layer are covered by shreds added to the layer. Accordingly, layer 12 should preferably be just thick enough to achieve 99+% coverage of the upper surface of insulation layer 11. Typically, layer 12 is at least $\frac{1}{4}$ inch thick in order to achieve such coverage, more particularly $\frac{1}{4}$ to $\frac{1}{2}$ inch thick, but preferably less than one-half inch thick.

The reflective shreds are preferably made of metallic reflective foil, most preferably aluminum foil, and have a thickness preferably not greater than 0.00050 inch, typically in the range of 0.00025 to 0.00050 inch. The length and width of the reflective shreds should allow the shreds to be handled without excessive tangling. More particularly, the reflective shreds should be at least 2 inches long and at least $\frac{1}{8}$ inch wide, preferably 4 to 8 inches long and $\frac{1}{8}$ to $\frac{1}{2}$ inch wide.

Figure 2:
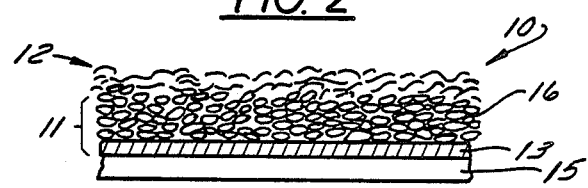
FIG. 2 is a cross-sectional view of a second embodiment of the insulating material according to the invention.

FIG. 2 illustrates a second embodiment of the insulating material according to the invention. In this embodiment, thermal insulation layer 11 comprises vapor barrier layer 13 and a layer of loose particulate insulation materials 16. Such particulate insulation material is well known, and includes, for example, the cellulose and foam materials described above. Radiant barrier layer 12 is conveniently formed directly over loose insulation layer 16 as shown in FIG. 2.

Figure 3:
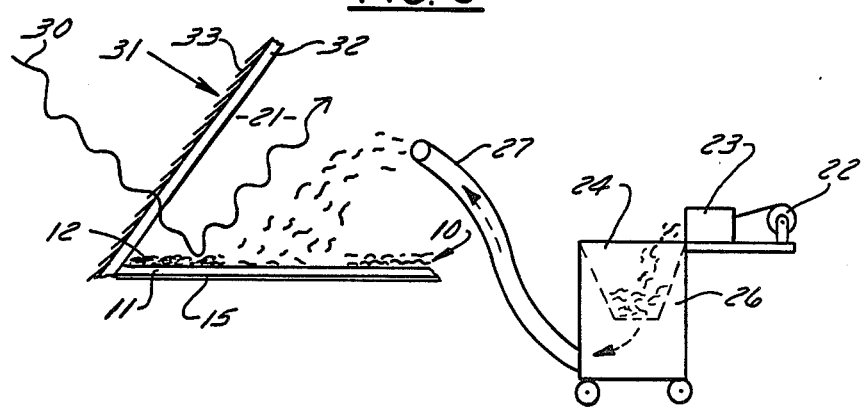
FIG. 3 is a schematic diagram showing one embodiment of the method and apparatus of the present invention.

As illustrated in FIG. 3, to install the barrier in an attic space 21 of 2,000 square feet, aluminum foil of 0.00050 inch thickness from a 6,000 square foot roll 22 is fed into a conventional paper shredder 23 positioned so that foil shreds from shredder 23 are deposited into the hopper 24 of a conventional blower 26 for installing loose insulation. Hose (flexible tube) 27 of blower 26 is used to direct the foil shreds over the existing insulation layer 11 covering floor 15 so as to form a $\frac{1}{4}$ inch thick reflective barrier layer 12 thereon. Layer 12 causes long-wave solar radiation 30 to be reflected back out of attic space 21 through roof 31 (comprising wooden boards 32 and shingles 33) so that attic space 21 is not substantially heated thereby.

The method of the invention involves distributing the reflective shreds, such as narrow, thin, elongated strips of aluminum foil resembling tinsel, directly onto the thermal insulation layer 11 already present on the floor of an attic space. Reflective barrier layer 12 is preferably loose enough to allow air to circulate therethrough. Radiant barrier 12 desirably does not act as a vapor barrier, since this might trap moisture inside insulation layer 11 and render such insulation less efffective, as is commonly known. Layer 12 is best formed by shredding a sheet of reflective material, such as foil, immediately before forming layer 12.

Pre-shredded foil is not preferred for use in the present invention because such foil is apt to lose its resiliency (e.g., become creased and flattened) during storaqe prior to use. However, layer 12 can be pre-formed on thermal insulation layer 11 and secured thereto by any suitable means, such as a vapor-permeable cover sheet overlying layer 12 and secured to layer 11, such as by sewing or stapling, to form a flexible, layered assembly. In the alternative, the reflective shreds or the surface of layer 11 can be supplied with an adhesive for adhering the shreds to layer 11. An insulation material 11 thus prefabricated can then be readily installed on an attic floor.

To install the barrier in an attic floor having, for example, 2,000 square feet of surface, at least about 4,000, preferably 6,000, square feet of reflective material is used to form the radiant barrier layer. In general, the square footage of reflective shreds in layer 12 is at least twice, preferably at least three times the square footage of the corresponding floor space. For most applications, where sheet foil is used to make the reflective shreds, the amount of sheet foil should be two to four times the square footage of the upper surface of layer 12 covering the attic floor.

The present invention provides an economical method of forming a radiant barrier layer which does not act as a vapor barrier. The reflective shreds used to make the radiant barrier layer according to the invention provide a large number of surfaces for reflection. Thus, such shreds are more advantageous in this respect than foil sheeting, which has but a single reflective surface. Sheets of foil can readily become dirty or damp and thereby lose their reflective properties. Additionally, the radiant barrier layer of the present invention contains substantial air space, and acts to some extent as additional thermal insulation. Finally, the foil shreds, according to the invention, can be readily installed, and if the radiant barrier layer is disrupted, it can be easily repaired by simply re-distributing the shreds in the proper positions. This contrasts sharply with foil sheets, which are virtually useless once ripped or pulled out of position.

The present invention thus provides a means for reducing attic heat during the cooling season and reducing heat loss during the heatinq season. The foil shreds have reflective surfaces on both sides, so that during the winter some infrared radiation will be reflected back into the interior of the building by the underside of the radiant barrier layer. In a performance test wherein a radiant barrier layer was formed over standard fiberglass insulation, the radiant barrier layer caused a 17° F. decrease in temperature of the insulation as compared to a comparable piece of insulation not covered by a radiant barrier.

It will be understood that the above description is of the preferred exemplary embodiments of the present invention, and that the invention is not limited to the specific forms shown. Modifications may be made in the design and arrangement of the elements without departing from the spirit of the invention as expressed in the appended claims.

What is claimed is:

1. An insulating material for reflecting long-wave radiation emanating from a source comprising a batt of fiberglass fibers as a layer of thermal isulation material disposed on a supporting surface;

a supporting surface for said layer;

reflective foil randomly positioned between the source of radiation and said layer, said shreds having a shape and said bed having a depth sufficient to act as a barrier to the long-wave radiation; and a moisture-impermeable sheet adhered to one face of said fiberglass batt with said fiberglass batt interposed between said moisture impermeable sheet and said foiled shreds.

2. The insulating material of claim 1, wherein said reflective foil comprises metallic foil.

3. The insulating material of claim 2, wherein said foil shreds comprise aluminum foil.

4. The insulating material of claim 3, wherein said aluminum foil shreds have thicknesses in the range of about 0.00025 to 0.00050 inch.

5. The insulating material of claim 3, wherein said foil shreds have lengths of at least 2 inches and widths in the range of ⅛ to ½ inch.

6. The insulating material of claim 1, wherein the depth of said reflective barrier bed is less than about one-half inch.

7. The insulating material of claim 1, wherein said bed of foil shreds comprises a horizontally disposed bed of loose shreds.

8. A method for forming a radiant barrier layer in a building, which building has a roof, an attic space beneath said roof, an attic floor beneath said attic space, and interior space beneath said attic floor comprising the step of randomly distributing shreds of a thin, reflective material within the attic space in sufficient quantity to form a bed of loose shreds having a surface area at least about twice that of the attic floor so as to form a radiant barrier between said roof and interior space effective to reflect long-wave radiation, wherein a layer of nonreflective thermal insulation is interposed between said attic space and said interior space, and said shreds are distributed over said layer of nonreflective thermal insulation.

9. The method of claim 8, wherein said shreds are distributed by blowing said shreds into said attic space and allowing said shreds to settle.

10. The method of claim 8, further comprising the step of shredding a thin reflective metallic sheet to form said shreds.

11. The method of claim 8, wherein said shreds are made of aluminum foil.

12. The method of claim 11, wherein said aluminum foil shreds have thicknesses in the range of about 0.00025 to 0.00050 inch.

13. The method of claim 8, wherein said reflective shreds are made of metallic foil.

14. A method for installing a radiant barrier in a space bounded on one side by insulating material supported by a supporting surface comprising the steps of unwinding a roll of thin, reflective foil to obtain a sheet of said foil; shredding said sheet of thin reflective foil to form shreds of said foil; accumulating said shreds; randomly distributing said accumulated shreds in the space between the insulating material and a radiant source to form a substantially horizontal bed of loose shreds on the supporting surface.

* * * * *